United States Patent [19]
Barthez et al.

[11] Patent Number: 4,531,510
[45] Date of Patent: Jul. 30, 1985

[54] BIDIRECTIONAL THERMAL SYPHON VALVE, INSTALLATION FOR THE PRODUCTION AND STORAGE OF HEAT OR COLD COMPRISING SUCH A THERMAL SYPHON VALVE, AND VARIOUS USES

[75] Inventors: Roland Barthez, Boulogne; Francisque Boissonnet, Paris; René Bogo, Clichy-la-Garenne, all of France

[73] Assignee: Compagnie Francaise de Raffinage, Paris, France

[21] Appl. No.: 563,304

[22] Filed: Dec. 19, 1983

[30] Foreign Application Priority Data

Dec. 21, 1982 [FR] France ............................. 82 21453
Oct. 27, 1983 [EP] European Pat. Off. ......... 83402104.0

[51] Int. Cl.³ .................................................. F24J 3/02
[52] U.S. Cl. ..................................... 126/419; 126/422; 126/437; 165/104.33
[58] Field of Search ................ 126/422, 415, 416, 433, 126/434, 435, 437, 419; 137/625.29; 251/285, 286; 165/104.33, 104.32

[56] References Cited

U.S. PATENT DOCUMENTS

| | | | |
|---|---|---|---|
| 3,906,928 | 9/1975 | Wright | 126/416 |
| 4,146,087 | 3/1979 | Johansson | 126/434 |
| 4,191,172 | 3/1980 | Walch, Jr. et al. | 126/421 |
| 4,293,030 | 10/1981 | Rambach | 165/104.33 |
| 4,313,428 | 2/1982 | Goldenberg | 126/416 |
| 4,398,562 | 8/1983 | Saarem et al. | 126/422 |

FOREIGN PATENT DOCUMENTS 48201 1/1982 Japan .................................. 126/422

*Primary Examiner*—James C. Yeung
*Attorney, Agent, or Firm*—Curtis, Morris & Safford

[57] ABSTRACT

The invention relates to a bidirectional thermal siphon-valve operating by natural convection. It further relates to an installation for the production and storage of heat or cold comprising such a thermal siphon-valve, preferably with a continuously operating pump.

The thermal siphon-valve functions to direct a heat-transfer fluid toward one of two hydraulic circuits, or to divide it between the two circuits, on the basis of its temperature. It is distinguished by the fact that it comprises an entirely internally open tubular body (14) with a vertical axis which is provided with at least one inlet orifice (10a) for the heat-transfer fluid, located substantially in its middle portion, and two outlet orifices (10b, 10c) for the heat-transfer fluid, located in its lower and upper portions, respectively.

20 Claims, 7 Drawing Figures

BIDIRECTIONAL THERMAL SYPHON VALVE, INSTALLATION FOR THE PRODUCTION AND STORAGE OF HEAT OR COLD COMPRISING SUCH A THERMAL SYPHON VALVE, AND VARIOUS USES

The present invention relates to a bidirectional thermal valve, and more particularly to one which operates by natural convection as a thermal siphon-valve responsive to temperature-dependent changes in density and can be used with any system comprising an intermittent source of heat. It further relates to an installation for the production and storage of heat or cold comprising such a thermal siphon valve.

To simplify the description of the invention, it will be explained herein solely in terms of its application to solar energy.

As is known, conventional solar heating installations generally comprise one or more solar collectors intended to convert the energy of solar radiation into heat, a circuit for the heat-transfer fluid which comprises an inward-flow pipe connecting the outlet of the collectors to the storage tank, a pump circulating the fluid in said circuit, and a differential control unit which is electrically connected to the motor and to two sensors mounted on the inward-flow pipe and on the return-flow pipe, respectively.

The inward-flow sensor is usually located in the storage tank itself, and the return-flow sensor at the outlet of the collectors.

The control unit is designed so that when the temperature measured at the outlet of the collectors exceeds the temperature measured in the lower part of the storage tank by more than a specified value, it transmits an actuating signal to the pump, which then moves the heat from the collector to the tank. Conversely, when the spread between said temperatures drops below a second specified value, the control unit stops the operation of the pump.

While such an installation operates satisfactorily, its cost is rather high, mainly because of the cost of the control unit, which generally is a sophisticated piece of equipment, and because of the expenses arising from the difficulties of making the electrical connections as the installation is being assembled.

On the other hand, a solar installation is known which comprises neither a circulating pump nor a control unit and in which the circulation of the heat-transfer fluid occurs naturally, by the thermosiphon effect. Now while such an installation is of great simplicity, it can only operate when the collectors are mounted in proximity to the storage tank and at a lower level than the latter. Moreover, during their installation, the pipes of the collector circuit must be given a minimal inclination over their entire length so as not to hinder the circulation of the heat-transfer fluid by the thermosiphon effect. For the same purpose, a vent must be provided for the elimination of air bubbles which might slow down the circulation of the fluid. Obviously it is difficult in practice to satisfy these requirements since it is, on the contrary, desirable to place the collectors as high as possible, for example, on roofs or terraces, to keep them clear of anything that might cast a shadow. Moreover, the performance of an installation with thermosiphon generally is inferior to that of a conventional installation because of its lack of a pump. That is why little use is being made of installations with thermosiphon.

The Applicants have managed to overcome practically all of these drawbacks in providing a heating installation which dispenses with a control unit. This installation, which is the subject matter of French patent application No. 82-06258, filed on Apr. 9, 1982, comprises one or more collectors, a tank for the storage of the heat gathered by the collectors, a circuit connecting the collectors and the tank, a pump for the circulation of the heat-transfer fluid in said circuit, and, finally, a tripping means capable of actuating the pump as predetermined times not tied to the temperatures prevailing in the collectors and in the storage tank, the heat-exchange zone between the circuit and the tank being located at the bottom of the latter, where it occupies only little space in the vertical direction.

The tripping means consists of either a clock or a photovoltaic cell mounted in proximity to the collectors, or then of a combination of a resistance with large thermal lag, which surrounds a short section of the outlet pipe of the storage tank, and of a temperature sensor which detects the temperature of the fluid in that pipe section.

While such an installation is decidedly simpler and more economical than installations with conventional control systems, and while its performance is definitely superior to that of installations with a natural thermosiphon, it still is rather costly because of the tripping means it uses. Moreover, it still is difficult to assemble because of the electrical connections to be made between the tripping means and the pump motor.

The present invention provides an installation for the production and storage of the heat recovered at the outlet of a source producing heat intermittently which comprises neither a control unit nor electrical connections. Said installation is of the type which comprises a heat source, a storage tank, a plurality of pipes for the circulation of the heat-transfer fluid, and a pump for circulating the heat-transfer fluid in at least some of the pipes.

Said installation is distinguished by the fact that it further comprises a bidirectional thermal siphon valve intended to direct or divide the heat-transfer fluid on the basis of its temperature dependent relative density alone. Said thermal siphon valve comprises a tubular body with a vertical axis and comprising at least one inlet pipe for the heat-transfer fluid whose orifice is located substantially in the middle portion, and two outlet pipes for the heat-transfer fluid whose orifices are located in the upper and lower portions, respectively, of said valve body. This thermal siphon valve has not moving parts. All of its internal passages are continually open to one another. It is disposed in said installation in such a way that the inlet pipe for the heat-transfer fluid is connected to the heat source, the outlet pipe for the heat-transfer fluid whose orifice is located in the upper portion of the valve body is connected to the storage tank, and the outlet pipe for the heat-transfer fluid whose orifice is located in the lower portion of the valve body is connected at least to the heat source, the pump being disposed in the circuit which connects the heat source to the thermal siphon valve.

In accordance with a first embodiment of the invention, the outlet pipe whose orifice is located in the lower portion of the thermal siphon valve is also connected to the storage tank.

In accordance with a second embodiment of the invention, several outlet pipes have orifices located in the lower portion of the thermal siphon valve, one of these being connected to the storage tank.

The thermal siphon valve thus acts like a switch which directs (or divides) the flow of the heat-transfer fluid, set in motion by the pump, toward (or between) the storage tank and/or the pipe leading back to the heat source, on the basis of the temperatures (and thus the densities of the fluid contained in said tank and of the fluid coming from the heat source, respectively. Thus the tank can be reheated by the fluid coming from the heat source but cannot be cooled by the latter when the production of heat ceases.

The device of the invention thus permits cold fluid to circulate in the circuit without cooling the fluid in the storage tank. This makes it possible to dispense with any temperature-control means and to operate the circulating pump continuously.

This is a new and unexpected development since all designers of solar installations have become used to the idea that on overcast days the pump motor must be turned off as otherwise the tank will be cooled.

Another advantage of the installation in accordance with the invention is that it has no electrical connections except, of course, for the current input to the pump. The latter is no longer necessarily controlled by the temperature of the source and by that of the tank but is able to operate quite independently.

The invention can be used in any application where it is desired to recover the heat produced by an intermittent heat source, for example, at the output end of a nuclear, geothermal or other heat-generating station, or at the outlet of an apparatus for the recovery of heat from a domestic furnace, in a solar heating installation (in which case the source is formed by the solar collectors), or in any heating device using a heat-transfer fluid of the type with which today a differential thermostat is used.

Other objects, features, and advantages of the present invention will become more apparent from the ensuing detailed description and drawings which disclose several embodiments and modes of use of the invention. In this description and in the accompanying drawings there are shown certain preferred embodiments of the present invention; however it is to be understood that these embodiments are not intended to be exhaustive or limiting with respect to the invention. On the contrary, the illustrated embodiments are given for the purpose of illustration only in order that others skilled in the art may fully understand the principles of the invention and the purposes thereof, and the manner of applying it for practical use so that they may modify and adapt it in various forms each as may best be suited for the conditions of a particular use.

Several embodiments and modes of use of the invention will now be described in detail with reference to the accompanying drawings, wherein.

In these figures, identical components are identified by the same units digits and by a tens digit that indicates the figure.

Figure 1:
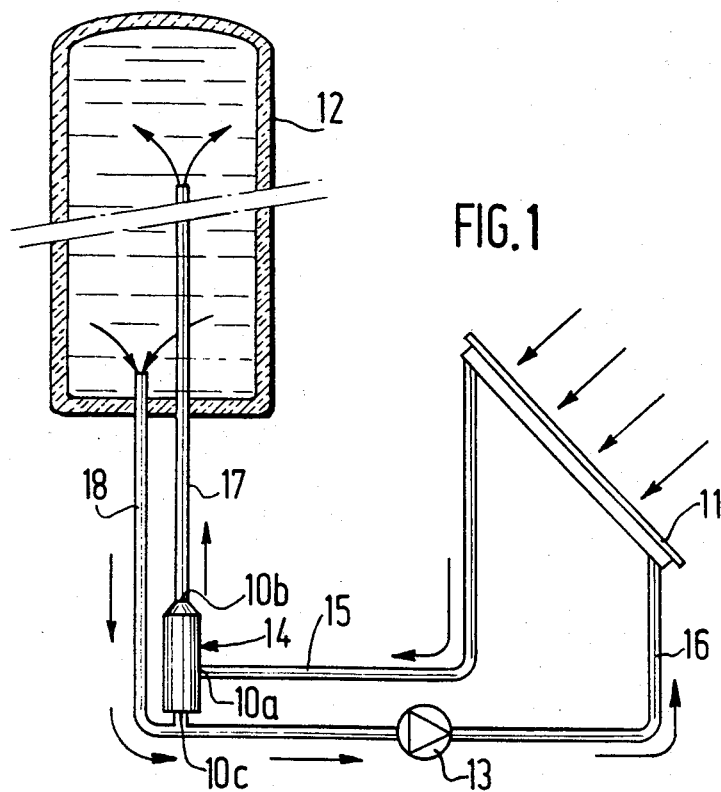
FIG. 1 is a diagrammatic representation of a solar heating installation using a bidirectional thermal siphon valve in accordance with a first embodiment which shows the flow path of the heat-transfer fluid when the temperature of the collectors is higher than that of the tank.

The installation for the production and storage of solar energy shown in FIG. 1 conventionally comprises one or more solar-energy collectors 11, a conventional storage tank 12 intended for the storage of the heat gathered by the collectors, a plurality of pipes intended to connect the collectors to the tank, and a pump 13 for circulating the heat-transfer fluid in said pipes.

In accordance with the present invention, there is disposed between the collectors and the tank a bidirectional thermal siphon valve 14 in the form of a tubular body, preferably a hollow right-circular cylinder with a vertical axis which is provided with at least three orifices, namely, an inlet orifice 10a for the heat-transfer fluid, located substantially in the middle portion of the body, and two outlet orifices 10b and 10c for the heat-transfer fluid, located in the upper and lower portions, respectively, of the tubular body.

As shown in FIG. 1, the thermal valve 14 is connected to the collectors 11 through an inward-flow pipe 15, which is joined to the inlet orifice 10a, and through a return-flow pipe 16, joined to the lower outlet orifice 10c. The thermal siphon valve is further connected to the tank 12 through an inward-flow pipe 17, joined to the upper outlet orifice 10b. There is a return-flow pipe 18 which in this first embodiment is not connected directly to the thermal siphon valve but is connected to the return-flow pipe 16.

Figure 2:
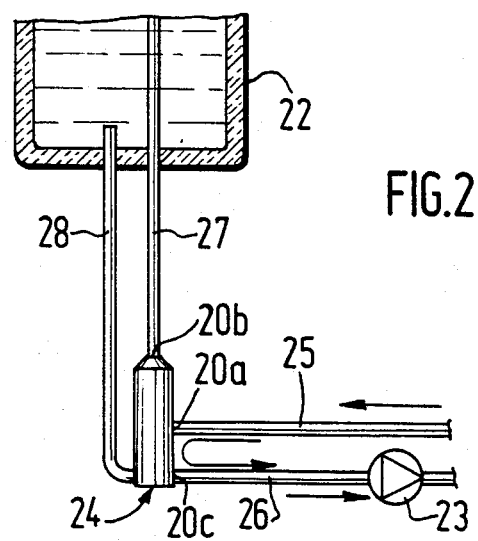
FIG. 2 is a diagrammatic representation of a solar heating installation using a bidirectional thermal siphon valve in accordance with a second embodiment which shows the flow path of the heat-transfer fluid when the temperature of the collectors is lower than that of the tank.

In accordance with a second embodiment, shown in FIG. 2, four pipes terminate in the thermal siphon valve 24, including a return-flow pipe 28 from the tank, which discharges into the lower portion of the valve, preferably opposite the lower outlet orifice 20c.

The principle of operation of this installation can now be described in detail with reference to FIGS. 1 and 2, which also show the circulation of the heat-transfer fluid on the basis of the temperatures of the collectors and of the tank, respectively.

FIG. 1 shows the flow path followed by the fluid when the temperature Tc of the collectors is higher than the temperature Tr of the tank. In practice, all of the hot fluid which reaches the body of the thermal siphon valve 14 through the inward-flow pipe 15 rises in pipe 17 to the tank 12. This fluid actually is unable to descend because the fluid present in the lower portion of the thermal valve is denser since it is at a temperature that is lower than that of the tank. The inlet pipe 17 discharges directly into the tank 12 at a level which generally is above that of the end of the outlet pipe 18 to prevent the hot fluid entering the tank from mixing with the cold fluid leaving it.

The cold fluid thus is withdrawn at the bottom of the tank through the outlet pipe 18 and then moved by the pump 13 to the collectors 11, where it is reheated, and the cycle is thus repeated.

Figure 5:
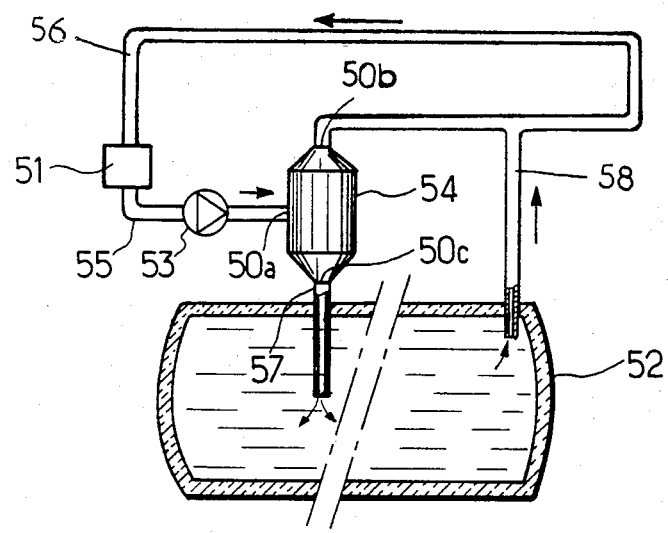
FIG. 5 shows an alternative mode of use in which the installation permits the storage of cold.

FIG. 2 shows the flow path followed by the fluid when the temperature Tc of the collectors is lower than the temperature Tr of the tank. In this case, the cold fluid which reaches the body of the thermal siphon valve 24 is denser than the fluid present in the upper portion of the valve body. It therefore descends to the lower portion of the valve body and returns to the collectors 21 through the return-flow pipe 26, aided by the suction of the pump 23. Note that having the return-flow pipe 28 join the bottom of the valve body 24, as shown in FIG. 2, is the functional equivalent of having the return-flow pipe 18 join the return-flow pipe 16 just beyond the outlet 10c, as shown in FIG. 1 (which in turn is the functional equivalent of having the return-flow pipe 58 join the return-flow pipe 56 just beyond the outlet 50b, as shown in FIG. 5).

The thermal siphon valve thus directs the fluid coming from the collectors fully automatically to the tank when the collectors are being heated by the sun, and in a closed loop to the collectors when they are not being heated. It thus acts as a true three-way valve. The fluid is directed to the tank only when the fluid which enters the thermal siphon valve is warmer than that present therein, and hence only when the collectors are exposed to solar radiation, solar energy being thus received at the level of the collectors and stored at the level of the tank. On the other hand, at night or on overcast days, the system is run in a closed loop with the collectors, without there being any heat exchange with the tank, and the pump motor can therefore be operated continuously, without a costly system of thermometric sensors being required.

The thermal siphon valve works much like a switch; and by analogy with the terminology of such a device in electrical or electronic systems, the heat-transfer fluid may be directed on an on-off basis or also on a proportional basis when the difference between the temperature Tr and Tc is not very large. The tubular body serves an essential function, which is to prevent turbulence in the entering fluid, which, at this level, must choose between two opposite directions. To balance this choice, the orifice for the inlet pipe 15 has been located in the middle portion of the valve body. However, without departing from the scope of the present invention, that orifice may also be shifted along a generatrix so as to favor passage into the tank circuit or, conversely, into the collector circuit. The inlet orifice may also be located tangentially relative to the base circle of the valve body so as to cause the fluid to rotate as it penetrates into the interior of the valve body, thus promoting the desired flow pattern.

Moreover, various shapes may be considered for the valve body (cylindrical, spherical, etc.) or for its ends (plane, hemispherical, frustoconical, etc.) without departing from the scope of the present invention.

When in such an installation circulation of the fluid in the collector circuit is brought about by means of a pump, with the flow rate imposed by the latter, the circulation in the tank circuit will be effected by thermosiphon. The thermosiphon force can be expressed by the following formula:

$$\Delta P = (\rho_2 h_2 - \rho_1 h_1) g$$

wherein:
$\rho_2$ = density of hot fluid
$\rho_1$ = density of cold fluid
$h_2$ = height of hot fluid above inlet pipe 15
$h_1$ = height of cold fluid
g = acceleration due to gravity Thus, if the inlet pipe 15 is located in a middle position relative to the valve body, control will be practically neutral, except for head losses, whereas when that pipe is shifted downward or upward, circulation in the tank circuit is either promoted or inhibited.

Moreover, the head losses in a circuit, in the flow region considered (with a Reynolds number R greater than 2,000), are expressed by the following formula:

$$\Delta \phi = 6 \times 10^{-6} \mu \frac{\dot{m}^{1.25}}{d^{2.5}} l$$

wherein:
$\mu$ = dynamic viscosity of fluid
$\dot{m}$ = mass flow rate
l = length of circuit
d = diameter of pipe If on-off control is desired, the following inequality must be verified:

$$\Delta P \geq \Delta \phi$$
$$(\rho_2 h_2 - \rho_1 h_1) g \geq 6.10^{-6} \mu \frac{\dot{m}^{1.25}}{d^{2.5}} l$$

The densities $\rho_1$ and $\rho_2$ of the fluid are a function of the temperature $\theta_1$ of the cold fluid at the inlet to the collectors and of the temperature $\theta_2$ of the hot fluid at the outlet of the collectors.

For the thermosiphon to start, it is thus necessary to have a certain temperature differential $(\theta_2 - \theta_1)$, which in a very general way depends on the form and dimensions of the circuits. In fact, two temperature differentials may be established in such an installation, one in the tank circuit, the operating differential (above a certain temperature difference, all of the hot fluid flows into the tank circuit), and the other in the collector circuit, which in effect acts as a stopping differential (meaning that below a certain temperature difference all of the cold fluid flows into the collector circuit).

While this is not the only parameter in the dimensioning of the circuits, it is one of the principal factors which enter into it. Thus, each circuit should be dimensioned on the basis of the chosen flow rate.

Figure 3:
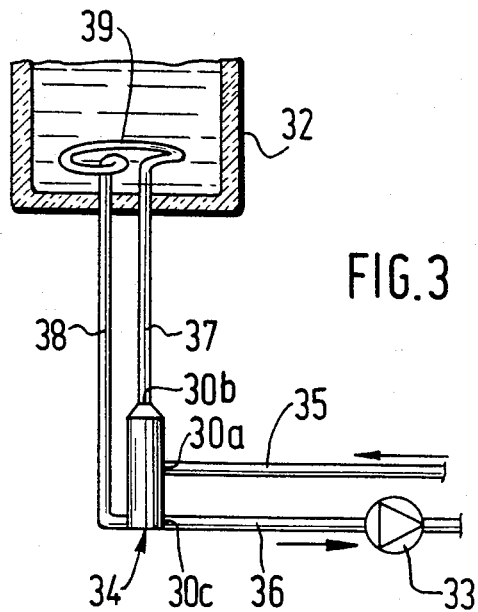
FIG. 3 shows an installation similar to that of FIG. 1, except that here the heat transfer takes place in a heat exchanger.

FIG. 3 shows an installation which is similar to that of FIG. 1 but in which the heat transfer at the level of the tank takes place in a heat exchanger 39 of the spiral type, for example. This installation will be required if the fluid circulating in the collectors contains antifreeze and the fluid stored in the tank 32 is used for sanitary purposes.

Figure 4:
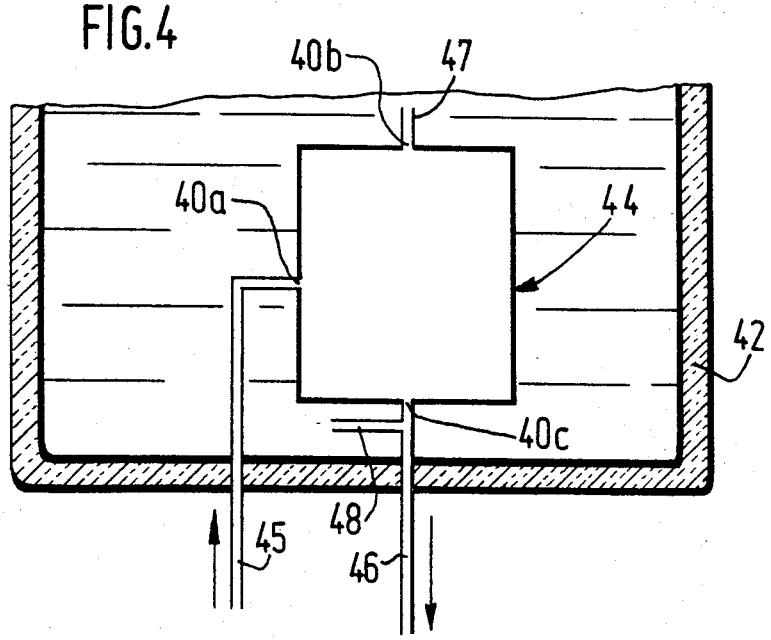
FIG. 4 shows an alternative embodiment in which the bidirectional thermal siphon valve (in vertical cross-section showing the wholly open internal passages without any moving parts) is immersed in the storage tank.

FIG. 4 shows an alternative embodiment for use when the thermal siphon valve 44 is immersed in the storage tank 42. In this case, the pipes identified by the reference numerals 17 and 18 in FIG. 1 are lacking, being replaced by simple short inlet and outlet pipes 47 and 48, respectively. However, the function of this thermal siphon valve is the same; it makes it possible to prevent the continuously circulating cold fluid from cooling the storage tank. As seen particularly from the cross-sectional view of the valve 44 in FIG. 4, pipes 45, 46, 47, and 48 are advantageously in open communication with one another through valve 44, and preferably, there are no internal moving parts to this bidirectional thermal siphon-valve 44.

While the preceding description is that of a solar heating installation, it is fully applicable to any heat source, and especially to a heat source which operates intermittently and at present requires the use of differential thermostats.

The use just described is the storage of heat; but as will presently be explained, the thermal siphon valve in accordance with the invention can also be used for the storage of cold.

FIG. 5 shows an example of an installation for the storage of cold. In this installation, the tank 52 is located at a lower level than the thermal siphon valve 54.

When the temperature of the cold fluid coming from the source 51 by way of the pipe 55 is below that of the tank 52, the cold fluid descends along the thermal siphon valve and flows through the orifice 50c and the pipe 57 into the tank, where it cools the relatively warm upper layer of the fluid. At the same time, an equal volume of fluid from the upper layer returns through pipes 58 and 56 to the source 51, where it is cooled.

On the other hand, if the temperature of the cold fluid is higher than that of the tank, the cold fluid rises in the thermal siphon valve, exits through the orifice 50b and returns to the source 51, where it is cooled.

Figure 6:
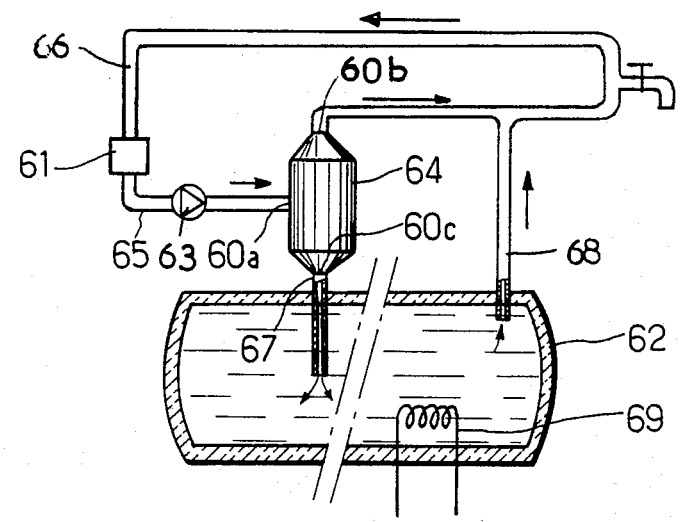
FIG. 6 shows a further alternative mode of use in which the installation permits fluid to be supplied at a temperature that is equal to or higher than that of the tank.

FIG. 6 illustrates an application in which the thermal siphon valve 64 in accordance with the invention serves to supply a service pipe 66 with water of a minimum temperature equal to or higher than that of the tank 62. To this end, the tank is maintained at a constant temperature by means of an auxiliary heat source, for example, an electrical resistor 69, and the thermal siphon valve is mounted at a higher level than the tank. The inward-flow pipe 65 is connected to a heat source 61 of any type, such as solar collectors.

When the temperature of the fluid coming in through the pipe 65 is higher than that prevailing in the tank, the fluid flows directly into the service pipe 66 through the orifice 60b. On the other hand, if the fluid coming in through pipe 65 is colder than that in the tank, it flows into the tank and an equal volume of fluid at the temperature of the tank supplies the service pipe 66 through the pipe 68. As a result, the temperature in the pipe 66 is higher than or equal to that of the tank.

Figure 7:
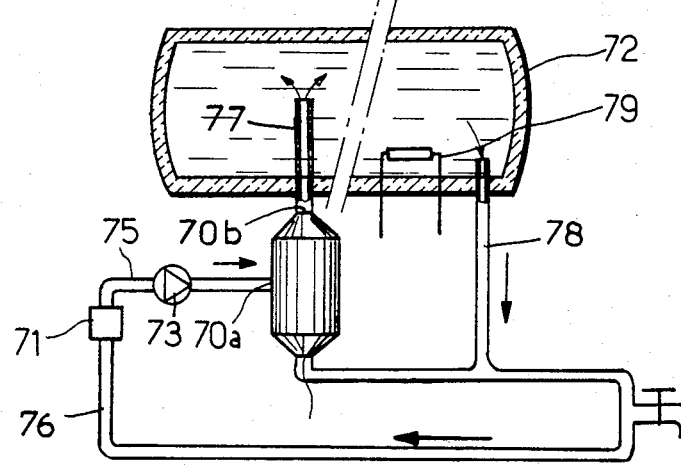
FIG. 7 shows a last alternative mode of use in which the installation permits fluid to be supplied at a temperature that is equal to or lower than that of the tank.

Conversely, the installation of FIG. 7 permits a service pipe 76 to be supplied with water at a maximum temperature equal to or lower than that of the tank 72. To this end, the tank is maintained at a constant temperature by an auxiliary heat source 79 and the thermal siphon valve is mounted at a lower level than the tank.

When the temperature of the fluid coming from the heat source 71 through the pipe 75 is higher than that of the tank, the fluid rises into the tank and an equal amount of water at the temperature of the tank feeds the service pipe 76 through the pipe 78. On the other hand, if the fluid in pipe 75 is colder than that in the tank 72, it descends in the thermal siphon valve to supply the pipe 76 directly. The temperature in that pipe 76 therefore is lower than or equal to that of the tank.

While there has been described what are at present considered to be the preferred embodiments of this invention, it would be apparent to those skilled in the art that various changes and modifications may be effected therein without departure from the scope and spirit of this invention; it is therefore our aim that the appended claims cover all such variations, changes, and modifications as may fall within the true spirit and scope of this invention.

We claim as our invention:

1. Installation for the production and storage of heat recovered at an outlet of a heat-producing source that produces heat intermittently comprising a thermal siphon-valve, for directing the flow of a heat transfer liquid, formed of a tubular hollow body having a vertically oriented axis, at least one inlet orifice located along the axial length of said body, and upper and lower outlet orifices located respectively in upper and lower end portions of said tubular body with said inlet orifice therebetween and with all of said orifices being in continuous physically open communication with one another;

a storage tank located to have a hydrostatic head at a higher elevation than said thermal siphon-valve;

a source circuit including an inward-flow conduit coupled from said source to the inlet orifice of said tubular body and a return-flow conduit coupled from said source to the lower outlet orifice of said tubular body;

a tank circuit comprising an inlet conduit coupled to said storage tank from the upper outlet orifice of said tubular body, and an outlet conduit coupled from said storage tank to the return-flow conduit of said source conduit; and pumping means in said source circuit for pumping the heat transfer liquid in said source circuit between said source and said thermal siphon-valve.

2. Installation according to clam 1, wherein said pumping means includes a pump in the return-flow conduit of said source circuit.

3. Installation according to claim 2, wherein said pump is configured to operate continuously.

4. Installation according to claim 1, wherein the outlet conduit of the tank circuit is connected to an additional distinct orifice located at the lower end of said tubular body but such that the liquid flowing therefrom into said body is substantially in direct flow communication with said lower outlet orifice.

5. Installation according to claim 1, wherein said thermal siphon valve is mounted within said tank, said outlet conduit feeds directly from said tank, and said inlet conduit discharges directly into the liquid of the tank.

6. Installation for the production and storage of cold recovered at an outlet of a cold-producing source that intermittently absorbs heat comprising a thermal siphon-valve, for directing the flow of a heat transfer liquid, and formed of a tubular hollow body having a vertically oriented axis, at least one inlet orifice located along the axial length thereof, and upper and lower outlet orifices located respectively in upper and lower end portions of said tubular body with said inlet orifice therebetween and with all of said orifices being in continuous physically open communication with one another;

a storage tank located at a lower level than said thermal siphon-valve;

a source circuit including an inward-flow conduit coupled from said source to the inlet orifice of said thermal siphon-valve and a return-flow conduit coupled from the upper outlet orifice of said thermal siphon-valve to said source;

a tank circuit comprising an inlet conduit coupled from the storage tank to the lower outlet orifice of said thermal siphon-valve and an outlet conduit coupled from said storage tank to the return-flow conduit of said source conduit; and pumping means in said source circuit for pumping the heat-transfer liquid in said source circuit between said source and said thermal siphon-valve.

7. Installation for delivery of a heat-transfer liquid whose temperature is equal to or higher than a minimum limiting value, comprising a source producing heat intermittently;

a bidirectional thermal siphon-valve for selectively diverting said heat-transfer liquid to a high temperature outlet or a low temperature outlet, or dividing the liquid between the two outlets, on the basis of the liquid's relative temperature-related densities, comprising a tubular body with a vertical axis, two outlet orifices for the heat-transfer liquid, said outlets being located in the upper and lower portions of the valve body respectively, at least one inlet orifice for the heat-transfer liquid, all of said orifices being in continuous physically open communication with one another, and said valve body being enlarged relative to said orifices;

a heat storage tank located at a lower level than said thermal siphon-valve and containing said liquid, and the tank including, for maintaining the temperature of the liquid in the tank at a temperature at least equal to said minimum value, an auxiliary heat source;

a source circuit including an inward-flow conduit coupled from said source to the inlet orifice of said thermal siphon-valve and a return-flow conduit coupled from the upper outlet orifice of said thermal siphon-valve to said source; and a tank circuit including an inlet conduit coupled from the storage tank to the upper outlet orifice of said thermal siphon-valve and a return conduit coupled from the lower outlet orifice of said thermal siphon-valve to said storage tank.

8. Installation according to claim 7, further comprising pumping means in said source circuit for pumping the liquid in said source circuit between said source and said thermal siphon valve.

9. Installation for delivery of a heat-transfer liquid whose temperature is equal to or below a maximum limiting value, comprising a source producing heat intermittently;

a bidirectional thermal siphon-valve for selectively diverting said heat-transfer liquid to a high temperature outlet or a low temperature outlet, or dividing the liquid between the two outlets, on the basis of the liquid's relative temperature-related densities, comprising a tubular body with a vertical axis, two outlet orifices for the heat-transfer liquid, said outlets being located in the upper and lower portions of the valve body respectively, at least one inlet orifice for the heat-transfer liquid, all of said orifices being in continuous physically open communication with one another, and said valve body being enlarged relative to said orifices;

a heat storage tank located above said thermal siphon-valve and containing said liquid, the tank including, for maintaining the temperature of the liquid in the tank at a temperature equal to said maximum value, an auxiliary heat source;

a source circuit including an inward-flow conduit coupled from said source to the inlet orifice of said thermal siphon-valve and a return-flow conduit coupled from the lower outlet orifice of said thermal siphon-valve to said source; and a tank circuit including an inlet conduit coupled from the storage tank to the lower outlet orifice of said thermal siphon-valve and a return conduit coupled from the upper outlet orifice of said thermal siphon-valve to said storage tank.

10. Installation according to claim 9, further comprising pumping means in said source circuit for pumping the liquid in said source circuit between said source and said thermal siphon valve.

11. A bidirectional thermal siphon-valve unit for selectively diverting heat-transfer liquid from an intermediate inlet to a high temperature outlet or a low temperature outlet, or dividing the liquid between the two outlets, on the basis of the liquid's relative temperature-related densities, comprising a tubular body with a vertical axis, two outlet orifices for the heat-transfer liquid, said outlets being located in the upper and lower portions of the valve body respectively, an effectively single higher pressure inlet orifice for the heat-transfer liquid vertically positioned between said outlet orifices, all of said orifices being in continuous physically open communication with one another, said valve body being enlarged relative to said orifices, pump means for supplying said liquid to said single inlet orifice at a higher pressure relative to all other orifices in said valve, means for forming a first closed flow loop from one of said two outlets to said inlet which loop includes an external thermal source means and said pump means, and means for forming a second closed flow loop from said other outlet to said one outlet or its functional equivalent which second loop includes a thermal storage means; such that said valve can direct a liquid flow driven by said pump means to circulate through both loops passing seriatim through said thermal source means and said thermal storage means, can bypass said second loop to circulate only through said thermal source means alone, or can divide the flow partially to circulate through both loops and partially to bypass the second loop.

12. A thermal siphon-valve according to claim 11, wherein said inlet orifice of the tubular body is located substantially midway along its axial length.

13. A thermal siphon-valve according to claim 11, wherein said inlet orifice of the tubular body is located substantially in proximity to one of said outlet orifices, considered in the axial direction of the tubular body.

14. A thermal siphon valve according to claim 12, wherein said tubular body is, in cross section, a right circular cylinder generated about a base circle, and said inlet orifice is arranged tangentially relative to the base circle so as to cause liquid entering the tubular valve body to rotate as it flows towards the interior of the tubular body, thereby promoting non-turbulent flow within the tubular body.

15. A thermal siphon-valve according to claim 11, wherein said valve body and said orifices are shaped for minimal turbulance of liquid flow therethrough so as to enhance flow separation of liquids of different densities.

16. A thermal storage installation comprising a closed circuit of heat-transfer liquid, a storage tank having an inlet and outlet to said circuit, a remote heat transfer source having an inlet and outlet to said circuit, a bypass forming a short-circuit between said outlet and inlet of said source, a pump in said circuit between said bypass and said source, said bypass and the adjacent circuit being formed to constitute a bidirectional thermal siphon-valve means for diverting flow of said heat-transfer liquid received from said source's outlet either to said tank's inlet or away from said tank to said source's inlet via said bypass in response to a change in temperature of said liquid through a predetermined range, said bypass and adjacent portions of said circuit connected to said valve means being openly interconnected through said valve means, and the orifices of said inlet and outlet of said storage tank being at different heights with said inlet orifice being higher for high temperature storage and lower for low temperature storage.

17. An installation according to claim 16, further comprising being a liquid, and said valve means having no internal moving parts and being of an enlarged vertically oriented shape relative to said bypass and adjacent circuit.

18. A cold storage installation according to claim 17, wherein said bypass joins the upper portion of said valve and said tank inlet orifice is below said outlet orifice.

19. A heat storage installation according to claim 17, wherein said bypass joins the lower portion of said valve and said tank inlet orifice is above said outlet orifice.

20. An installation according to claim 17, wherein said thermal siphon-valve means is shaped for minimally turbulent flow therethrough.

* * * * *

UNITED STATES PATENT AND TRADEMARK OFFICE
CERTIFICATE OF CORRECTION

PATENT NO. : 4,531,510
DATED : July 30, 1985
INVENTOR(S) : Roland Barthez, et al.

It is certified that error appears in the above-identified patent and that said Letters Patent is hereby corrected as shown below:

Column 12, line 2 (claim 17, line 2), delete "being a liquid, and"

Signed and Sealed this

Twenty-ninth Day of October 1985

[SEAL]

Attest:

Attesting Officer

DONALD J. QUIGG

Commissioner of Patents and
Trademarks—Designate